United States Patent
König et al.

(10) Patent No.: US 8,988,024 B2
(45) Date of Patent: Mar. 24, 2015

(54) METHOD AND CONTROL SYSTEM FOR DRIVING A BRUSHLESS ELECTRIC MOTOR

(75) Inventors: Daniel König, Gerabronn (DE); Ralph Wystup, Künzelsau (DE)

(73) Assignee: EBM-Papst Mulfingen GmbH & Co. KG, Mulfingen (DE)

( * ) Notice: Subject to any disclaimer, the term of this patent is extended or adjusted under 35 U.S.C. 154(b) by 547 days.

(21) Appl. No.: 13/352,808

(22) Filed: Jan. 18, 2012

(65) Prior Publication Data
US 2012/0194110 A1 Aug. 2, 2012

(30) Foreign Application Priority Data
Jan. 27, 2011 (EP) .................................. 11152387

(51) Int. Cl.
- H02P 1/04 (2006.01)
- H02P 6/16 (2006.01)
- H02P 27/08 (2006.01)

(52) U.S. Cl.
CPC . *H02P 6/16* (2013.01); *H02P 27/08* (2013.01)
USPC .................................................. 318/400.17

(58) Field of Classification Search
CPC ............. H02P 6/14; H02P 6/16; H02P 6/182; H02P 6/08; H02P 2209/07
See application file for complete search history.

(56) References Cited

U.S. PATENT DOCUMENTS

2002/0145419 A1* 10/2002 Luetzow et al. ......... 324/207.12
2003/0098668 A1* 5/2003 Jadric et al. .................. 318/801
(Continued)

FOREIGN PATENT DOCUMENTS

| EP | 2 164 164 A1 | 3/2010 |
| EP | 2 276 162 A1 | 1/2011 |

(Continued)

OTHER PUBLICATIONS

Tranlation of EP2164164 A1.*
(Continued)

*Primary Examiner* — Shawki S Ismail
*Assistant Examiner* — Zoheb Imtiaz
(74) *Attorney, Agent, or Firm* — Brinks, Gilson & Lione (57) ABSTRACT

In a method and control system for controlling a brushless, electronically commutated electric motor (M), a three-phase source AC voltage ($U_N$) is rectified and fed to a DC link voltage ($U_{ZK}$), which is supplied to an inverter (2) via a slim DC link circuit (6). A motor control unit (10) for PWM pulsing controls the inverter for commutating the electric motor (M) and adjusting the motor speed with a variable duty cycle (A). The duty cycle (A) is influenced by a compensating factor (k) such that the product of the DC link voltage ($U_{ZK}$) and a resulting DC link current ($I_{ZK}$) is kept constant in the link circuit (6). The DC link voltage ($U_{ZK}$) is monitored. When a first threshold value ($U_{ZKac.max1}$) of an AC component ($U_{ZKac}$) is exceeded, the compensating factor (k) is modified to lower the current AC component ($U_{ZKac}$) below the threshold value ($U_{ZKac.max1}$).

11 Claims, 3 Drawing Sheets

(56) References Cited

U.S. PATENT DOCUMENTS

| | | | |
|---|---|---|---|
| 2009/0254300 A1* | 10/2009 | Schneider et al. | 702/145 |
| 2010/0117577 A1* | 5/2010 | Yanagishima | 318/432 |
| 2011/0117577 A1* | 5/2011 | Reboud et al. | 435/7.23 |
| 2011/0211282 A1* | 9/2011 | Nanov | 361/18 |
| 2011/0245990 A1* | 10/2011 | Rasmussen | 700/298 |
| 2012/0049825 A1* | 3/2012 | Chen et al. | 323/284 |
| 2012/0091938 A1* | 4/2012 | Knezevic et al. | 318/490 |
| 2013/0082688 A1* | 4/2013 | Horvath | 324/120 |

FOREIGN PATENT DOCUMENTS

| | | | |
|---|---|---|---|
| EP | 2164164 A1 | * | 3/2014 |
| JP | 2000-308205 | | 11/2000 |
| WO | PCTDK0950282 | * | 6/2009 |

OTHER PUBLICATIONS

Trarnslation of PCTDK09550282.*

European Search Report—Jul. 5, 2011.

* cited by examiner

METHOD AND CONTROL SYSTEM FOR DRIVING A BRUSHLESS ELECTRIC MOTOR

TECHNICAL FIELD OF THE INVENTION

The present invention relates to a method for controlling a brushless, electronically commutated electric motor, wherein a three-phase source AC voltage is rectified and fed to a DC link voltage, and this DC voltage is supplied to an inverter via a slim DC link circuit, where said inverter can be controlled via a motor control unit for commutating the electric motor and for adjusting the motor speed with a variable duty cycle such that by means of a defined pulsating voltage, which is variable via the duty cycle, quasi-sinusoidal motor currents are generated, the slim DC link being configured without a smoothing capacitor, or at least without an electrolytic capacitor with at least one film capacitor, and thus with correspondingly low link circuit impedance, in particular low link circuit capacity, so that the DC link voltage is subject to a periodic disturbance variable, the duty cycle being influenced by a compensating factor in order to compensate the disturbance variable such that the product of the DC link voltage and a resulting link circuit current is kept constant in the link circuit over time.

The invention further also relates to a corresponding control system operating in accordance with the inventive method.

In brushless, electronically commutated electric motors, so-called EC motors, it has been known to generate phase voltages from a DC link voltage via a PWM controlled inverter (PWM=pulse width modulation) for phase windings of the motor, wherein by varying the duty cycle, i.e. the so-called duty factor, of the PWM controller the motor speed can also be adjusted. Usually, the DC link voltage is generated by rectifying a single-phase, or, in particular, three-phase source AC voltage, a pulsating, strong DC voltage ripple occurring via an uncontrolled bridge rectifier. In the case of a three-phase source AC voltage with the usual 50 Hz frequency, the rectified voltage pulsates at a pulse rate of 300 Hz. Smoothing via at least one smoothing capacitor and, if need be, an additional filter choke is therefore in fact necessary. Owing to the relatively high capacity of the smoothing capacitor required for this purpose, electrolytic capacitors (elcos) are normally used, which in practical use, however, have some disadvantages, namely, in particular, a large size and short lifetime.

There is therefore now a tendency to either totally dispense with smoothing capacitors or at least with electrolytic capacitors, durable film capacitors with low capacity being used in the second case. In this case, mention is made of a "slim DC link". This, however, meets with the disadvantage that the remaining ripple is transferred to the motor torque as a disturbance variable. A pulsating torque or, as the case may be, a torque ripple, however, causes strong noise which can be very disturbing, in particular in fan drives.

It has therefore been known to provide a disturbance variable compensation, the disturbance variable and the duty cycle being influenced by a compensating factor such that the product of the DC link voltage and a link circuit current resulting via the inverter is kept constant in the link circuit over time. This compensation of the DC link voltage ripple thus causes a constant power consumption by the electric motor. The inverse function of the DC link voltage is superimposed to the motor duty cycle. For this purpose, the motor duty cycle is increased and reduced in case of a respectively decreasing or increasing DC link voltage such that the product of the link circuit current and DC link voltage remains constant. This means that in case of a respectively decreasing DC link voltage the link current has to increase.

In document EP 2 164 164 A1, a particular kind of disturbance variable compensation is provided in a corresponding control system for controlling a brushless electric motor, namely a dynamically optimized disturbance variable compensation. During operation, the effect of the respective disturbance variable compensation on the current torque is sensed by monitoring the current torque and optimized periodically by varying the compensation variable or, as the case may be, the compensation factor, in order to minimize the torque ripple, and consequently also the noise generation.

In practice, a disturbance variable compensation combined with a slim DC link circuit can result in the disadvantage that inadmissible overvoltages occur in the link circuit. Since inverters are in general provided with an overvoltage switch-off device in order to protect the electronic components from inadmissible high voltages, this can cause undesired disconnections of the motor. In safety-relevant drives, such as fan drives, this can consequently lead to further damage by overheating a device to be cooled.

SUMMARY OF THE INVENTION

The underlying object of the present invention is to specify a method of the kind described above and provide a corresponding control system in order to extend the operating range of the electric motor so that the operation can also be preserved for operating ranges that are otherwise prone to failure.

The invention is based on the following findings. On account of the disturbance variable compensation mentioned above, with decreasing DC link voltage, the link circuit current respectively has to increase. A pulsating current is therefore generated, which in case of operating on high-impedance, in particular highly inductive power source, causes the source AC voltage to be activated and thus also the rectified DC link voltage in the link circuit. High current flows with low voltage, and the resulting decreasing voltage via the source inductance thus reduces the voltage applied to the consumer. If the source AC voltage increases, the source current decreases. The source inductance now basically acts as an auxiliary voltage source because the energy stored in the source impedance flows into the link circuit due to the now decreased source current. In this case, the voltage at the source inductance adds to the source AC voltage; a voltage overshoot occurs. This results in an increased proportion of the AC voltage in the DC link voltage, the voltage amplitude increasing with increasing source impedance and motor load. High voltage peaks can consequently occur such that the motor operation is switched off by an overvoltage protection.

In order to at least prevent this for an extended operating range according to the present invention a first embodiment provides that the DC link voltage is monitored with regard to the amplitude of its AC component, where, in case of reaching or exceeding a predefined first threshold value of the AC component, the compensating factor for reducing the disturbance variable compensation is modified until the current AC component again drops to or below the threshold value. The compensation can in this case be reduced to the point that there is no compensation any longer.

In an alternative, second embodiment of the invention (claims 2 and 7), a measuring DC voltage—instead of the DC link voltage as such—, which is additionally branched off the source voltage and separately rectified, is monitored and processed in a manner that is otherwise similar to the first embodiment. The measuring DC voltage is equal or at least proportional to the DC link voltage. In this connection, the disturbance variable including the variation according to the present invention is also compensated by means of the separate measuring DC voltage, so that a separate measurement and control circuit that is independent of the link circuit is virtually created. This second variant of the embodiment has the advantage that reactive effects of the electric motor commutation on the link circuit do not impact the separate measurement circuit, and more accurate and stable control characteristics are therefore accomplished.

As a result of reducing the compensation according to the present invention in both cases, the pulsating link circuit current is also reduced and an activation of the high-impedance power source is consequently prevented or at least reduced, so that voltage overshoots in the link circuit are counteracted as well, and an undesired disconnection of an overvoltage protection is prevented over an extended operating range. The power in the link circuit is, however, no longer kept constant under these operating conditions according to the present invention, so that the pulsating power has a negative effect on the motor torque and noise generation. This disadvantage is, however, accepted in the interest of the extended operating range of the motor.

If this measure according to the present invention described so far is not sufficient for the reduction of the AC component to or below the first threshold value, it is provided—virtually as a second operating stage according to the present invention—that if the current AC component of the DC link voltage or of the measuring DC voltage reaches or exceeds a predefined, second, higher threshold value, the motor duty cycle is modified to reduce the motor power. The motor operation is thus still further preserved, even though at reduced power and a correspondingly higher operating noise.

The present invention is in particular suitable for use in safety-relevant drives, such as fan drives, in which a failure might cause further damage, in particular due to overheating, as well as for operating such drives even at highly inductive power source. In this respect, the term "highly inductive" means that the source inductance reaches a value of 0.5 mH or higher. By means of the invention, the operating range of the electric motor can be extended up to a source inductance of at least 4 mH.

The invention shall be explained in more detail with reference to preferred exemplary embodiments.

DETAILED DESCRIPTION OF THE DRAWINGS

With respect to the description below, it is expressly pointed out that the invention has not been restricted to the exemplary embodiments, and thus not to all or several characteristics of described combinations of characteristics, but each individual partial characteristic of each exemplary embodiment can also be fundamental to the present invention independently of all other partial characteristics described above, as such or also in combination with any characteristic of another exemplary embodiment.

Figure 1:
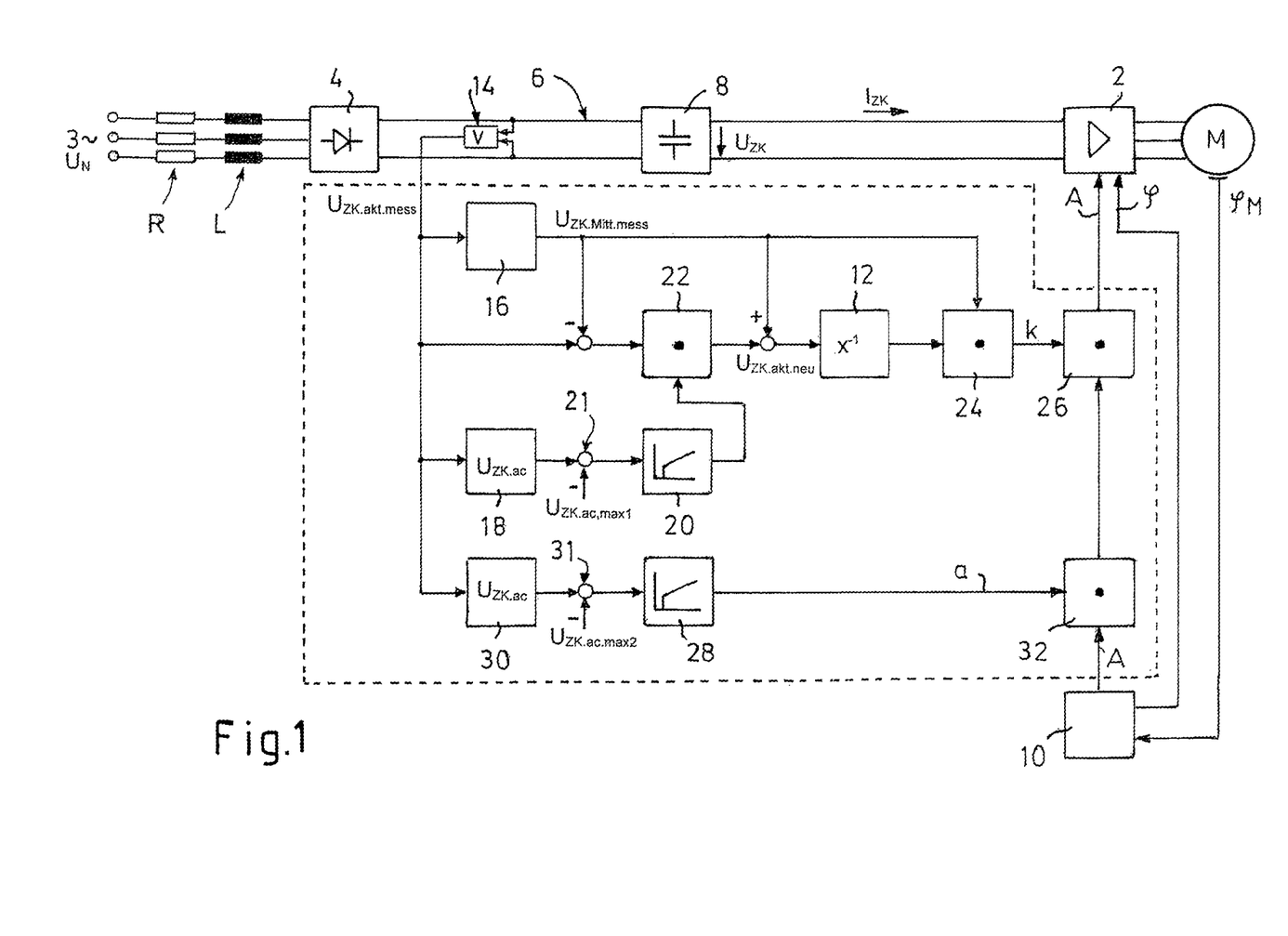
FIG. 1 a simplified, schematic block diagram of a first exemplary embodiment of a control system according to the present invention, FIG. 2 a simplified, schematic block diagram of a second exemplary embodiment of a control system according to the present invention, and FIG. 3 a diagram illustrating extended operating modes of the control system depending on the motor load, i.e. effective power, and source impedance.
Figure 2:
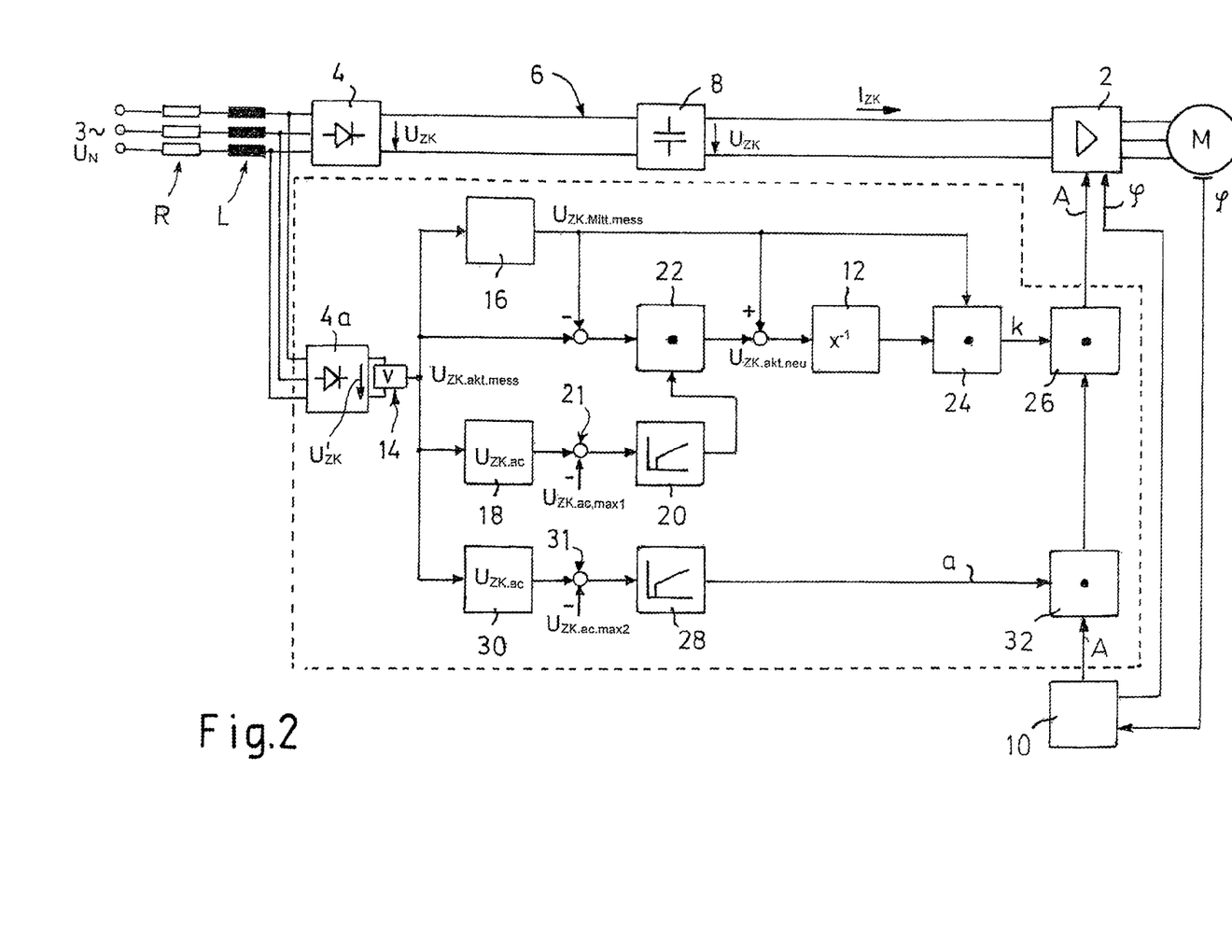

According to FIGS. 1 and 2, a control system according to the present invention is used for controlling a very schematically illustrated electric motor M, which preferably is a three-phase, permanent magnet excited synchronous motor (PMSM) that is in fact a three-phase motor which, however, is DC voltage operated via a controlled inverter 2. Such an electric motor M is therefore frequently called a collectorless, electronically commutated DC motor, or also EC motor in short.

A three-phase source AC voltage $U_N$ is initially rectified via an uncontrolled power rectifier 4 into a DC link voltage $U_{ZK}$ to supply motor M. The input circuit of the source AC voltage $U_N$ shows equivalent resistances R and equivalent inductances L in the three phases. The power rectifier 4 is connected to the rectifier 2 via a link circuit 6 which is configured as a so-called "slim DC link circuit". This means that it does not contain or only contains a very small link circuit impedance because a smoothing capacitor has either been totally dispensed with, or because instead of an electrolytic capacitor it only contains—as in the shown exemplary embodiment—a simpler film capacitor with low capacity as link circuit capacity 8. The capacity in the slim DC link circuit 6 is only at most 10% of the capacity actually required for smoothing the rectified, pulsating DC link voltage $U_{ZK}$ in a so-called "fat link circuit". Basically, the amount of capacity at least depends on the consumer power. Depending on the design, the capacity in a fat link circuit can, for example, be 330 µF; in this case, a design with a slim DC link circuit would result in a link capacity 8 in the order of magnitude of only 5 to 20 µF.

Owing to the low link circuit capacity 8 in the slim DC link circuit 6, the DC link voltage $U_{ZK}$ is subject to a periodic disturbance variable; it pulsates around an average value, i.e. an AC component is superimposed to that of the DC voltage corresponding to the average value.

The inverter 2 is configured as a full bridge final stage consisting of six controlled power semiconductors, which are controlled by a motor control unit 10 depending on the rotor's rotary position φ, which is sensed with suitable means, for commutating the electric motor M and for adjusting the speed. This is carried out in a sufficiently known manner by means of pulse width modulation (PWM), so that quasi sinusoidal motor phase voltages and currents are modulated. For this purpose, a PWM duty cycle A is sent by the motor control unit 10 to the inverter 2 as an applicable variable. This type of motor control unit is sufficiently known and needs no further explanation.

Owing to the slim DC link circuit 6, the pulsating DC link voltage $U_{ZK}$ that is subject to a disturbance variable via the inverter 2 would generate an accordingly pulsating motor torque, which would be associated with disturbing noise levels. In order to prevent this, a known disturbance variable compensation is contained in the control system according to the present invention.

In the embodiment according to FIG. 1, the pulsating DC link voltage $U_{ZK}$ subject to the disturbance variable is inverted in an inverting element 12, and this inverse function of the DC link voltage $U_{ZK}$ is superimposed to the motor duty cycle A as a compensating factor k. If the DC link voltage $U_K$ is respectively decreasing over time, the duty cycle A is increased such that the link circuit power $P_{ZK}$ to a large extent remains constant as the product of the DC link voltage $U_K$ and the respectively resulting link circuit current $I_{ZK}$, then the following applies:

$$P_{ZK}(t) - U_{ZK}(t) - I_{ZK}(t) = \text{const.}$$

This means that with a respectively decreasing DC link voltage $U_K$ the link circuit current $I_{ZK}$ has to increase respectively. The consequence is a correspondingly pulsating link circuit current $I_{ZK}$, which in case of a high impedance power source may result in too high voltage peaks in the link circuit 6 due to a circuit feedback, and which may subsequently result in that the motor is switched off by a triggered overvoltage protection of the inverter 2.

In order to prevent this and extend the operating range of the electric motor M, even with high impedance power source, the following measures are taken according to the present invention.

According to FIG. 1, the DC link voltage $U_K$ is measured with a voltmeter 14 at the link circuit 6 as the current voltage $U_{ZK.akt.mess}$. On this basis, the average value $U_{ZK.Mitt.mess}$ is averaged in an averager 16. In addition, according to the present invention, the AC component $U_{ZKac}$ of the measured, current DC link voltage $U_{ZK}$ is calculated in an AC element 18 as the amount between the maximum and minimum values, and compared to a predefined threshold value $U_{ZK.ac.max1}$ in a comparator 21 allocated to a first controller 20. When this threshold value is reached or exceeded, the disturbance variable compensation is reduced in order to reduce the link circuit current ripple $I_{ZK}$ in the link circuit 6 and thus prevent a too strong source activation.

The controller 20 configured as PI controller gives an output signal to a multiplier 22, in which the currently measured link voltage $U_{ZK.akt.mess}$ is changed anew to a voltage $U_{ZK.akt.neu}$ modified to compensate the disturbance variable. In a multiplier 24 arranged downstream of the inverting element 12, a current, adjusted compensating factor k is calculated anew from the average value $U_{ZK.mitt.mess}$ and the modified current link circuit voltage $U_{ZK.akt.neu}$ and superimposed to the duty cycle A in a multiplier 26, so that by modifying the duty cycle A the AC component is again at least reduced to the predefined threshold value $U_{ZK.ac.max1}$.

The correction of the AC voltage component of the link circuit voltage is performed via the following equation:

$$U_{ZK.akt.neu} = (U_{ZK.akt.mess} - U_{ZK.Mitt.mess}) \cdot S_k = U_{ZK.Mitt.mess}$$

where:

$U_{ZK.akt.neu}$ = the corrected DC link voltage
$U_{ZK.akt.mess}$ = the currently measured DC link voltage
$U_{ZK.Mitt.mess}$ = the average value of $U_{ZK.akt.mess}$ (DC component)
$(U_{ZK.akt.mess} - U_{ZK.Mitt.mess})$ = the AC component of $U_{ZK.akt.mess}$
$S_k$ = the scaling factor of the AC component with $S_k$=0 to 1

The compensating factor k for the modified disturbance variable compensation of the DC voltage ripple is calculated with $$k = \frac{U_{ZK.Mitt.mess}}{U_{ZK.akt.neu}}$$

In the event that, under certain operating conditions, the so far described measures are not sufficient to keep the AC component $U_{ZK.ac}$ at or below the first threshold value $U_{ZK.ac.max1}$ a controller 26 with an upstream AC element 30 and a second threshold value comparator 31 are preferably provided. If the currently calculated AC component $U_{ZK.ac}$ of the link circuit voltage reaches or exceed a predefined second threshold value $U_{ZK.ac.max2}$, the second threshold value being higher than the first threshold value mentioned above, the PI controller 28 gives an output signal a, which is configured and superimposed to the duty cycle A in a multiplier 32 such that a reduction in the motor power is achieved.

Now, with regard to the variant of the embodiment shown in FIG. 2, it corresponds to a very large extent to the embodiment according to FIG. 1, and therefore, similar or functionally corresponding components and magnitudes are provided with the same reference numerals and designations. The substantial difference in this embodiment according to FIG. 2 compared to FIG. 1 is that the DC link voltage $U_{ZK}$ is not directly measured, monitored and used for further processing. Instead, the three-phase AC source voltage $U_N$ is branched off and rectified via an additional, uncontrolled source rectifier 4a and fed to a likewise correspondingly pulsating, measuring DC voltage that is subject to a disturbance variable, which corresponds to the DC link voltage $U_{ZK}$ or at least is proportional to it. The measuring DC voltage, which is likewise measured with a voltmeter 14, is therefore designated with $U_{ZK}'$, and its respectively currently measured value is likewise designated in this case, as in FIG. 1, with $U_{ZK.akt.mess}$ for the sake of simplicity. Further evaluation and processing exactly corresponds to the embodiment according to FIG. 1, so that reference is made to the explanations mentioned above. This embodiment according to FIG. 2 with the separate measuring DC voltage $U_{ZK}'$ is in particular advantageous because the measurement, control and regulator circuit operate independently, and therefore also more accurately and stable, of the actual DC link voltage $U_{ZK}$ and of the motor reactions occurring in the link circuit 6.

Figure 3:
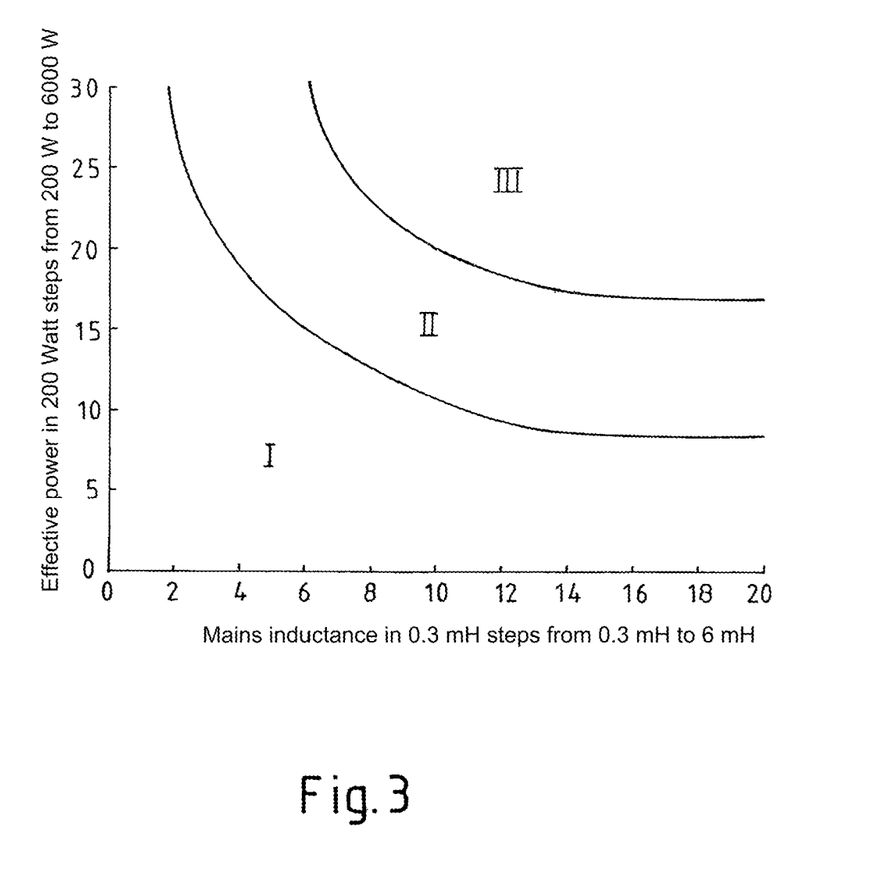

FIG. 3 shows the extended operating ranges. In this diagram, the source inductance is plotted on the X-axis, for example in 0.3 mH steps from 0.3 to 6 mH each, and the effective power is plotted on the Y-axis, for example in 200 W steps of 200 W to 6000 W each. A first operating range I is the normal operation with full disturbance variable compensation. In a second operating range II, a continued operation with reduced to fully omitted disturbance variable compensation is possible. In a transitional range between the second operating range II and an adjacent range III the operation is carried out at reduced effective power and without disturbance variable compensation. If both measures according to the present invention are not sufficient, the operation is switched off via a usual overvoltage switch-off device of the inverter 2.

By means of the invention, the electric motor M can advantageously be operated beyond the operating range I in the transition from range II to III, even though at increased noise levels and, if need be, reduced power.

A special dynamically optimized disturbance variable compensation, as described in the document EP 2164 164 A1, can be used in a preferred embodiment, to which full reference is made. During operation, the effect of the respective disturbance variable compensation on the current torque is sensed by monitoring the current torque and optimized periodically by varying the compensation variable or, as the case may be, the compensating factor k, in order to minimize the torque ripple, and consequently also the noise generation.

The invention is not limited to the illustrated and described exemplary embodiments, but also comprises all equally acting embodiments along the lines of the invention. It is expressly stated that the exemplary embodiments are not limited to all combined characteristics; on the contrary, each partial characteristic can also be inventively important by itself independently of all other partial characteristics.

The invention claimed is:

1. A method for controlling a brushless, electronically commutated electric motor (M) of the type in which a three-phase AC source voltage ($U_N$) is rectified and fed to a DC link voltage ($U_{ZK}$), and this DC voltage ($U_{ZK}$) is supplied to an inverter (2) via a slim DC link circuit (6), and in which the inverter (2) can be controlled via a motor control unit (10) for PWM pulsing in order to commutate the electric motor (M)

and adjust a motor speed and a motor power with a variable duty cycle (A), the method comprising the steps of:

modifying the duty cycle (A) with a compensating factor (k) for compensating for a periodic disturbance variable, such that the product of the DC link voltage ($U_{ZK}$) and a resulting link circuit current is kept constant, directly or indirectly monitoring the DC link voltage ($U_{ZK}$) for an amplitude of an AC component ($U_{ZKac}$) of the DC link voltage, determining that the AC component ($U_{ZKac}$) has reached or exceeded a predefined first threshold value ($U_{ZKacmax1}$), and modifying the compensating factor (k) until the AC component ($U_{ZKac}$) is reduced below the threshold value ($U_{ZKac.max1}$), wherein the compensating factor (k) is calculated depending on a currently measured DC link voltage ($U_{ZK.akt.mess}$), an average value of the currently measured DC link voltage ($U_{ZK.mitt.mess}$) and a scaling ($S_K$) and is varied using a controller (20) depending on the currently measured DC link voltage ($U_{ZK.akt.mess}$).

2. The method according to claim 1, wherein the DC link voltage is indirectly monitored by additionally rectifying the AC source voltage ($U_N$) into an additional measuring DC voltage ($U_{ZK}'$) representative of the DC link voltage ($U_{ZK}$), wherein the measuring DC voltage ($U_{ZK}'$) is monitored with regard to the amplitude of the AC component ($U_{ZKac}$), and where, in case of reaching or exceeding the predefined first threshold value ($U_{ZKac.max1}$) of the AC component ($U_{ZKac}$), the compensating factor (k) is modified.

3. A method for controlling a brushless, electronically commutated electric motor (M) of the type in which a three-phase AC source voltage ($U_N$) is rectified and fed to a DC link voltage ($U_{ZK}$), and this DC voltage ($U_{ZK}$) is supplied to an inverter (2) via a slim DC link circuit (6), and in which the inverter (2) can be controlled via a motor control unit (10) for PWM pulsing in order to commutate the electric motor (M) and adjust a motor speed and a motor power with a variable duty cycle (A), the method comprising the steps of:

modifying the duty cycle (A) with a compensating factor (k) for compensating for a periodic disturbance variable such that the product of the DC link voltage ($U_{ZK}$) and a resulting link circuit current is kept constant, direct or indirect monitoring the DC link voltage ($U_{ZK}$) for an amplitude of an AC component ($U_{ZKac}$) of the DC link voltage, determining that the AC component ($U_{ZKac}$) has reached or exceeded a predefined first threshold value ($U_{ZKacmax1}$) and modifying in the compensating factor (k) until the AC component ($U_{ZKac}$) is reduced below the threshold value ($U_{ZKac.max1}$), determining that the AC component ($U_{ZKac}$) has reached or exceeded a second, higher threshold value ($U_{ZKac.max2}$) of the AC component ($U_{ZKac}$) higher than the first threshold value, and modifying the duty cycle (A) to reduce the motor power.

4. The method according to claim 1, further comprising the steps of:

determining that the DC link voltage incurs inadmissibly high voltage peaks, and switching off the electric motor (M).

5. The method according to claim 1, further comprising the step of:

dynamically optimizing a disturbance variable compensation with a controller to minimize a torque ripple of the electric motor (M).

6. A control system for a brushless, electronically commutated electric motor (M), the system comprising:

a source rectifier (4), which rectifies a three-phase source AC voltage ($U_N$) and feeds it to a DC link voltage ($U_{ZK}$), an inverter (2) arranged downstream of the source rectifier via a slim DC link circuit (6), a motor control unit for controlling the inverter (2) for reducing PWM voltage pulsing with a variable duty cycle (A) commutating the electric motor (M) and adjusting a motor speed and motor power, and a device for compensating a disturbance variable representative of a periodic disturbance of the DC link voltage ($U_{ZK}$), the device influencing the duty cycle (A) by a compensating factor (k) such that the product of the DC link voltage ($U_{ZK}$) and a resulting DC link current ($I_{ZK}$) is kept constant in the link circuit (6), the motor control unit having a first control circuit with a first controller (20) which compares a quantity representative of an amplitude of an AC component ($U_{ZKac}$) of the DC link voltage ($U_{ZK}$) to a first threshold value ($U_{ZKac.max1}$), and which, upon determining that the amplitude has reached or exceeded the first threshold value, modifies the compensating factor (k) until the quantity representative of the AC component ($U_{ZKac}$) is reduced below the first threshold value, wherein the compensating factor (k) is calculated depending on a current measured DC link voltage ($U_{ZK.akt.mess}$), an average value of the current measured DC link voltage ($U_{ZK.Mitt.mess}$) and a scaling factor ($S_K$) and is varied using a controller (20) depending on the currently measured DC link voltage ($U_{ZK.akt.mess}$).

7. The control system according to claim 6, further comprising a source rectifier (4a), which rectifies the source AC voltage ($U_N$), feeds it to a separate measuring DC voltage ($U_{ZK}'$), and compares the amplitude of an AC component ($U_{ZKac}$) of the measuring DC voltage ($U_{ZK}'$) to a predefined first threshold value ($U_{ZKac.max1}$) by means of the controller (20).

8. A control system for a brushless, electronically commutated electric motor (M) using the method according to claim 1, the system comprising:

a source rectifier 4 which rectifies a three-phase source AC voltage ($U_N$) and feeds it to a DC link voltage ($U_{ZK}$), an inverter (2) arranged downstream of the source rectifier via a slim DC link circuit (6), a motor control unit for controlling the inverter (2) for reducing PWM voltage pulsing with a variable duty cycle (A) commutating the electric motor (M) and adjusting a motor speed and motor power, and a device for compensating a disturbance variable representative of a periodic disturbance of the DC link voltage ($U_{ZK}$) the device influencing the duty cycle (A) by a compensating factor (k) such that the product of the DC link voltage ($U_{ZK}$) and a resulting DC link current ($I_{ZK}$) is kept constant in the link circuit (6), the motor control unit having a first control circuit with a first controller (20) which compares a quantity representative of an amplitude of an AC component ($U_{ZKac}$) of the DC link voltage ($U_{ZK}$) to a first threshold value ($U_{ZKac.max1}$) and which, upon determining that the amplitude has reached or exceeded the first threshold value, modifies the compensating factor (k) until the quantity representative of the AC component ($U_{ZKac}$) is reduced below the first threshold value, and a second control circuit having a second controller (28) in the motor control unit, the second controller comparing the quantity representative of the amplitude of the AC component ($U_{ZKac}$) of the DC link voltage ($U_{ZK}$) to a predefined second threshold value ($U_{ZKac.max2}$) higher than the first threshold value, and, upon determining that the quantity has reached or exceeded the second threshold value, reducing the motor power by modifying the duty cycle (A).

9. The control system according to claim 8, wherein the second controller (20, 28) is configured as a PI controller.

10. The control system according to claim 6, wherein the first controller (20, 28) is configured as a PI controller.

11. The control system according to claim 6, further comprising an additional control unit for minimizing a torque ripple of the electric motor (M) by dynamically optimizing a compensation of the disturbance variable.

* * * * *

UNITED STATES PATENT AND TRADEMARK OFFICE
CERTIFICATE OF CORRECTION

| | | |
|---|---|---|
| PATENT NO. | : 8,988,024 B2 | Page 1 of 1 |
| APPLICATION NO. | : 13/352808 | |
| DATED | : March 24, 2015 | |
| INVENTOR(S) | : König et al. | |

It is certified that error appears in the above-identified patent and that said Letters Patent is hereby corrected as shown below:

<u>In the Claims</u>

In Column 7, Line 44, before "monitoring", please replace "direct or indirect" with -- directly or indirectly --.

In Column 7, Line 50, after "modifying", please delete "in".

In Column 8, Line 28, after "value of the", please replace "current" with -- currently --.

Signed and Sealed this
Seventh Day of July, 2015

Michelle K. Lee
*Director of the United States Patent and Trademark Office*